(12) United States Patent
Calasso

(10) Patent No.: US 9,683,594 B2
(45) Date of Patent: Jun. 20, 2017

(54) COATING MACHINE

(71) Applicant: TECNOLOGIC 3 S.R.L., Gorgonzola (MI) (IT)

(72) Inventor: Antonio Calasso, Gorgonzola (IT)

(73) Assignee: TECNOLOGIC 3 S.R.L., Gorgonzola (MI) (IT)

( * ) Notice: Subject to any disclaimer, the term of this patent is extended or adjusted under 35 U.S.C. 154(b) by 322 days.

(21) Appl. No.: 14/080,198

(22) Filed: Nov. 14, 2013

(65) Prior Publication Data

US 2014/0150722 A1 Jun. 5, 2014

(30) Foreign Application Priority Data

Dec. 4, 2012 (IT) .............................. MI2012A2074

(51) Int. Cl.
*B05B 13/02* (2006.01)
*F16B 35/00* (2006.01)

(52) U.S. Cl.
CPC .......... *F16B 35/00* (2013.01); *B05B 13/0228* (2013.01)

(58) Field of Classification Search
CPC .............................. B05B 13/0228; F16B 35/00
See application file for complete search history.

(56) References Cited

U.S. PATENT DOCUMENTS

| | | | | |
|---|---|---|---|---|
| 3,565,232 A | * | 2/1971 | Cadwallader | .......... B65G 29/00 198/476.1 |
| 4,842,890 A | * | 6/1989 | Sessa | .................. B05B 13/0235 411/302 |
| 5,238,496 A | * | 8/1993 | Koponen | ............ B05B 13/0221 118/324 |
| 6,027,568 A | * | 2/2000 | Wallace | ................ B05B 12/122 118/324 |
| 6,474,919 B2 | | 11/2002 | Wallace et al. | |
| 7,503,979 B2 | * | 3/2009 | Haller | ..................... B05C 5/001 118/324 |
| 2010/0310778 A1 | | 12/2010 | Shioi et al. | |

FOREIGN PATENT DOCUMENTS

| | | |
|---|---|---|
| CN | 1416965 A | 5/2003 |
| CN | 101939114 A | 1/2011 |
| DE | 10018656 | 11/2000 |
| EP | 2103356 A2 | 9/2009 |
| WO | 96/40444 | 12/1996 |
| WO | 98/30339 | 7/1998 |

OTHER PUBLICATIONS

Italian Search Report for MI2012A002074 filed on Dec. 4, 2012 in the name of Tecnologic 3 S.R.L.
Italian Search Opinion for MI2012A002074 filed on Dec. 4, 2012 in the name of Tecnologic 3 S.R.L.

* cited by examiner

*Primary Examiner* — Dah-Wei D Yuan
*Assistant Examiner* — Stephen Kitt
(74) *Attorney, Agent, or Firm* — Steinfl + Bruno LLP

(57) ABSTRACT

A coating machine for applying a coating to screws is described. The coating machine has an operating space along which the screws to be coated are fed. A fixed surface is defined, which is fixed relative to the frame of the machine and is designed for abutment and positioning of the screws in the section upstream from said operating space and in said operating space.

18 Claims, 15 Drawing Sheets

COATING MACHINE

CROSS REFERENCE TO RELATED APPLICATIONS

The present application claims priority to Italian Patent Application MI2012A002074 filed on Dec. 4, 2012, which is incorporated herein by reference in its entirety.

FIELD

The present disclosure relates to a machine for applying a coating to screws. Namely, the present disclosure concerns a coating/applying machine which is adapted to spread and/or apply a given product, generally a glue, on a circular cylindrical element such as a shaft of a screw.

BACKGROUND

For simplicity, reference will be particularly made herein, without limitation, to a coating machine for applying/spreading a layer of glue to a threaded shaft of a screw. Additionally, the present disclosure may also relate to a machine for applying/spreading such product to a general cylindrical element other than a screw shaft.

Screws or other equivalent threaded members having a threaded portion entirely or partially coated with fixing/sealing and/or self-locking materials are known in the art. Their purpose is to prevent properly tightened screws from unscrewing/loosening due to vibrations, shocks, thermal stresses and the like.

The need to be fulfilled is to spread/apply a layer of a suitable material over the entire circumference of at least one preset axial length of a screw. In view of fulfilling such requirement, various types of machines are known to be suitable for this purpose, which are generally known in the art as coating machines. These coating machines are designed to deposit a suitable fixing material on the threaded shafts of screws as they receive them from a vibrating feeder.

It shall be noted in this respect that there is a great variety of screws to be treated, not only in terms of possible sizes, but also and especially in terms of their possible configurations. An example of this variety of screws is screws that, while being of the same type, have different head heights.

In order to ensure treatment of screws of different types and/or sizes, these coating machines are equipped with special adjustment means, which may be used to adjust the operating units or members according to the particular screw to be treated.

In prior art coating machines, the adjustment of operating units and members has been found to be generally troublesome, whereby this operation is rather complex.

It shall be further noted that the adjustment of the coating machine to fit the physical characteristics of a particular screw adversely affects the possibility of feeding the screw through a vibrating feeder. When changing the position of the various members of the coating machine, including the inlet channel for the screws to be treated, the outlet of the vibrating feeder will become offset from such inlet channel for the screws to be treated, which will prevent the use of the machine without solving this problem.

In order to obviate the above drawback, a solution to the prior art coating machines consists in displacing/repositioning the coating machine with respect to the vibrating feeder and to move the outlet of the vibrating feeder back to alignment with the above mentioned screw inlet channel of the coating machine.

It shall be noted here that in most cases, the vibrating feeder is a stand-alone part, separate from the coating machine. Therefore, in spite of the possibility of providing an integrating unit comprising both the vibrating feeder and the coating machine, the need that is felt in the art is to use standalone coating machines to be combined with a standard vibrating feeder selected from those commercially available.

The present disclosure is based on the problem of conceiving and providing a machine for applying a coating to screws, namely a coating machine as defined above, that has such structural and functional characteristics as to fulfill the above needs, while obviating the above prior art drawbacks.

This problem is solved by a machine for applying a coating to screws, particularly a coating machine, as defined in one or more of the claims of the present application.

BRIEF DESCRIPTION OF THE DRAWINGS

Further features and advantages of the machine of the present disclosure will result from the following description of one preferred embodiment thereof, which is given by way of illustration and without limitation with reference to the accompanying figures.

DETAILED DESCRIPTION

Figure 1:
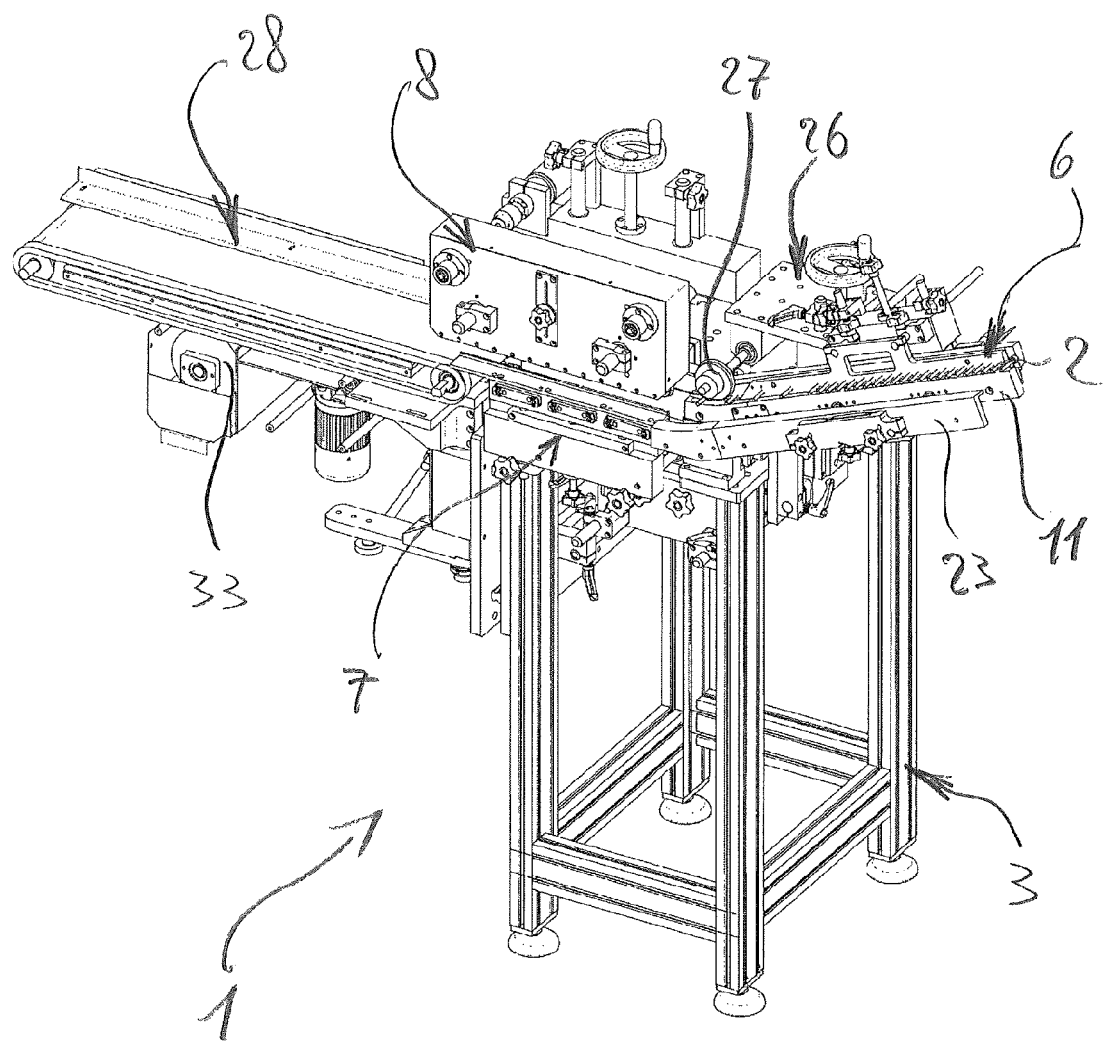
FIG. 1 shows a simplified perspective view of the front side of a machine of the present disclosure.
Figure 2:
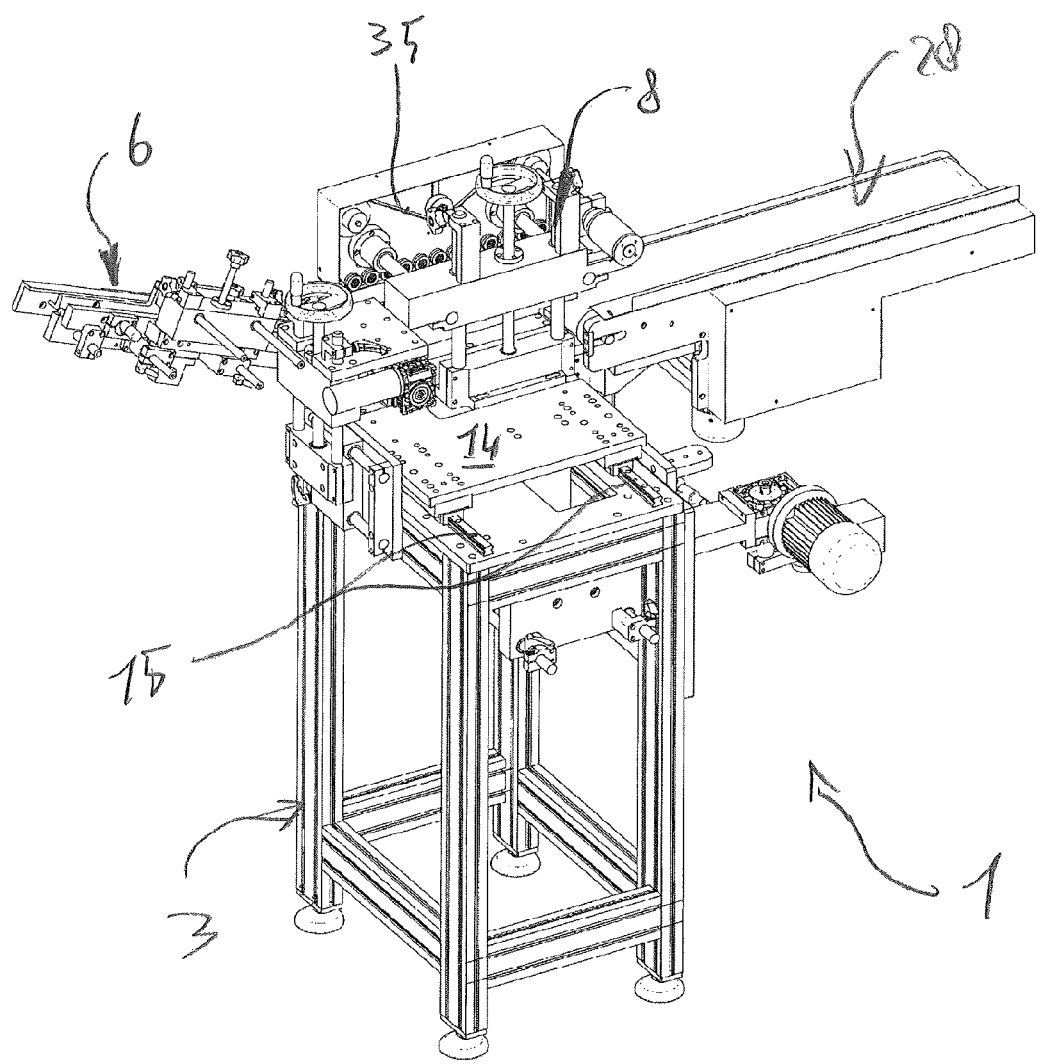
FIG. 2 shows a simplified perspective view of the machine of FIG. 1, as taken from the rear side thereof, i.e. the side opposite to the front side.
Figure 3:
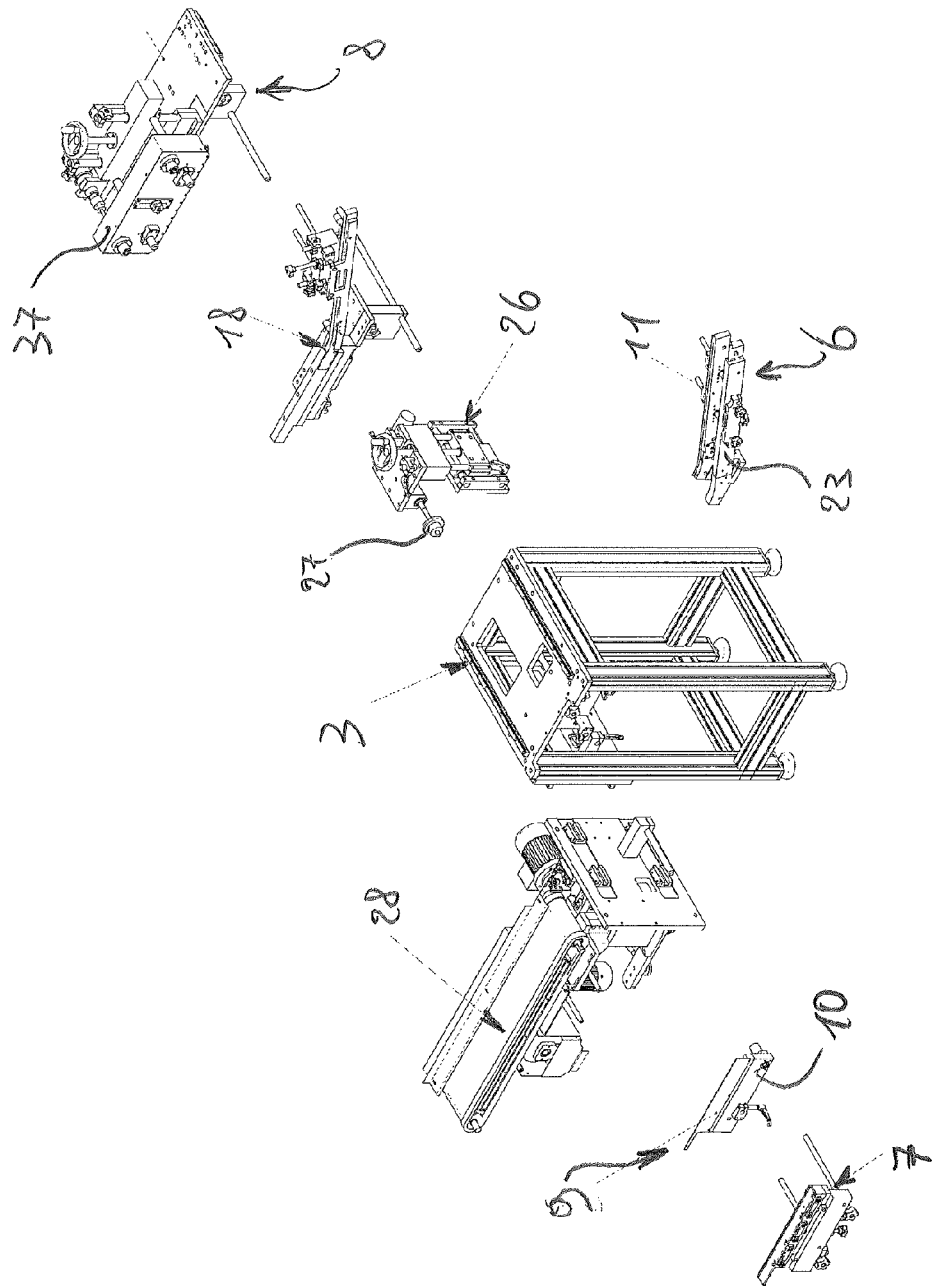
FIG. 3 shows an exploded perspective view of FIG. 1.
Figure 4:
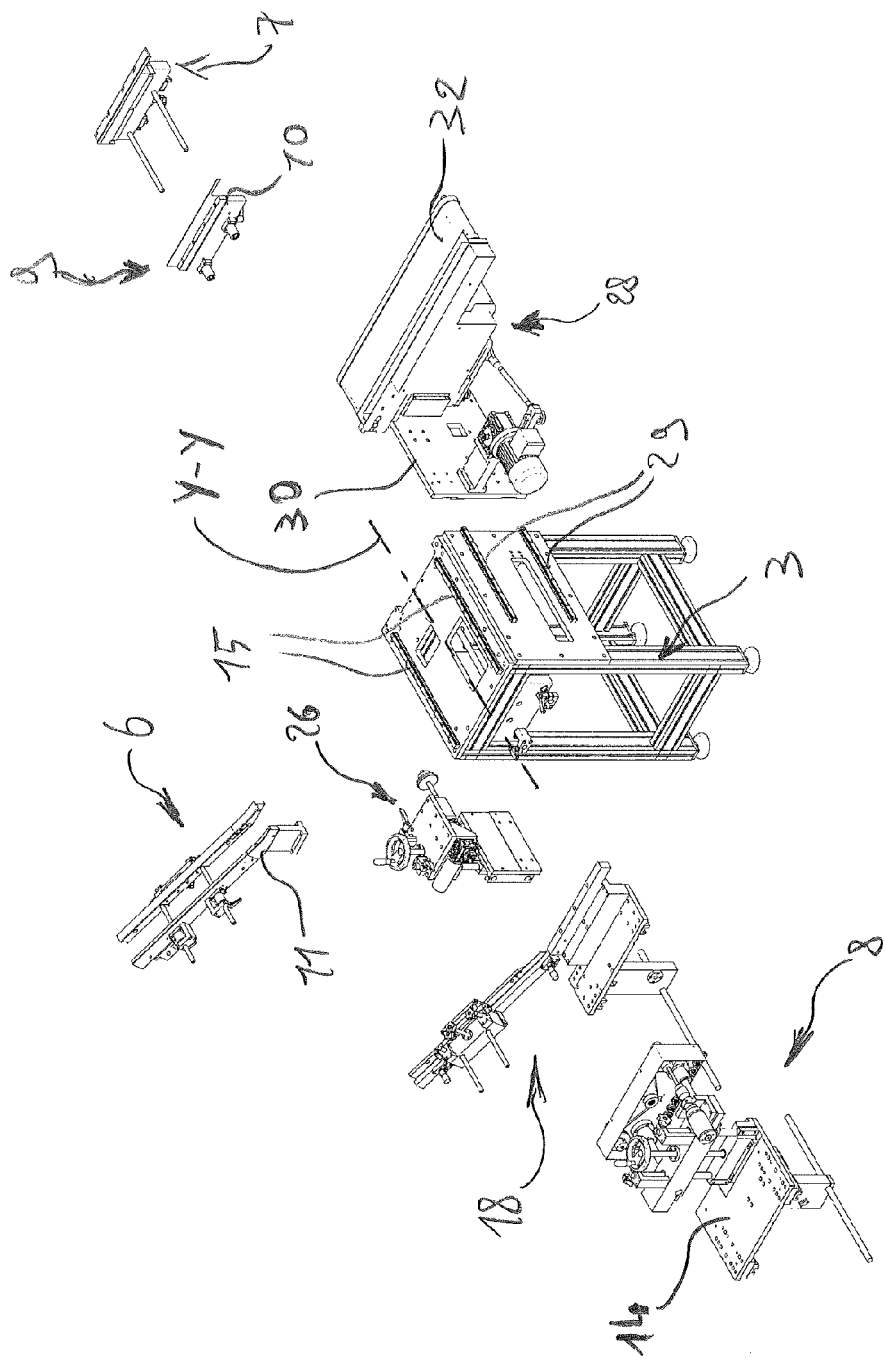
FIG. 4 shows an exploded perspective view of FIG. 2.

Referring to the accompanying figures, numeral 1 generally designates a machine for applying a coating to screws according to the present disclosure.

Namely, the machine is a coating/applying machine which is adapted to spread and/or apply a given product, generally a glue, on a circular cylindrical element such as a shaft of a screw.

Some of the above figures (see, for example, FIGS. 1, 5, 14, and 15) also illustrate, by way of example, certain screws 2 in various positions.

Particularly, as is known per se, each screw 2 comprises a head with a threaded shaft extending therefrom. The head of each screw 2 has a top head wall and and an opposite bottom head wall, or underhead, from which the shaft extends.

The glue is applied to an axial length of the threaded shaft of the screw 2 by rolling such threaded shaft on or in the glue, which is preferably fluid, or another coating element to be applied, carried by a coating/applying unit.

More in detail, the machine 1 in accordance with several embodiments of the present disclosure comprises the following:
- a support frame 3 which can be used as a reference to define an operating space through which the screws 2 are advanced along a preset path of travel X-X extending from one inlet end to one outlet end of said operating space;
- a feed ramp unit 6 for feeding the screws 2 into the operating space, the feed ramp unit 6 being located at the inlet end upstream from the operating space, as viewed in the forward direction of travel of the screws 2, along the preset path of travel X-X, the feed ramp unit 6 having support points defined therein for supporting the screws 2 with the shaft extending in a first direction Y-Y perpendicular to the path of travel X-X and preferably lying on a horizontal plane;
- dispensing/spreading means 7 supported in the operating space and extending along the preset path of travel X-X between the inlet end and the outlet end, for applying a coating product, such as a glue, to the shafts of the screws 2 that travel through the operating space;
- advancing means 8 supported in the operating space and operating along the preset path of travel X-X between the inlet end and the outlet end, for driving the screws 2 in the operating space, and
- abutment means 9 supported in the operating space for defining an abutment and positioning plane for the screws 2 along the path of travel X-X as the screws are advanced from the inlet end to the outlet end.

Figure 5:
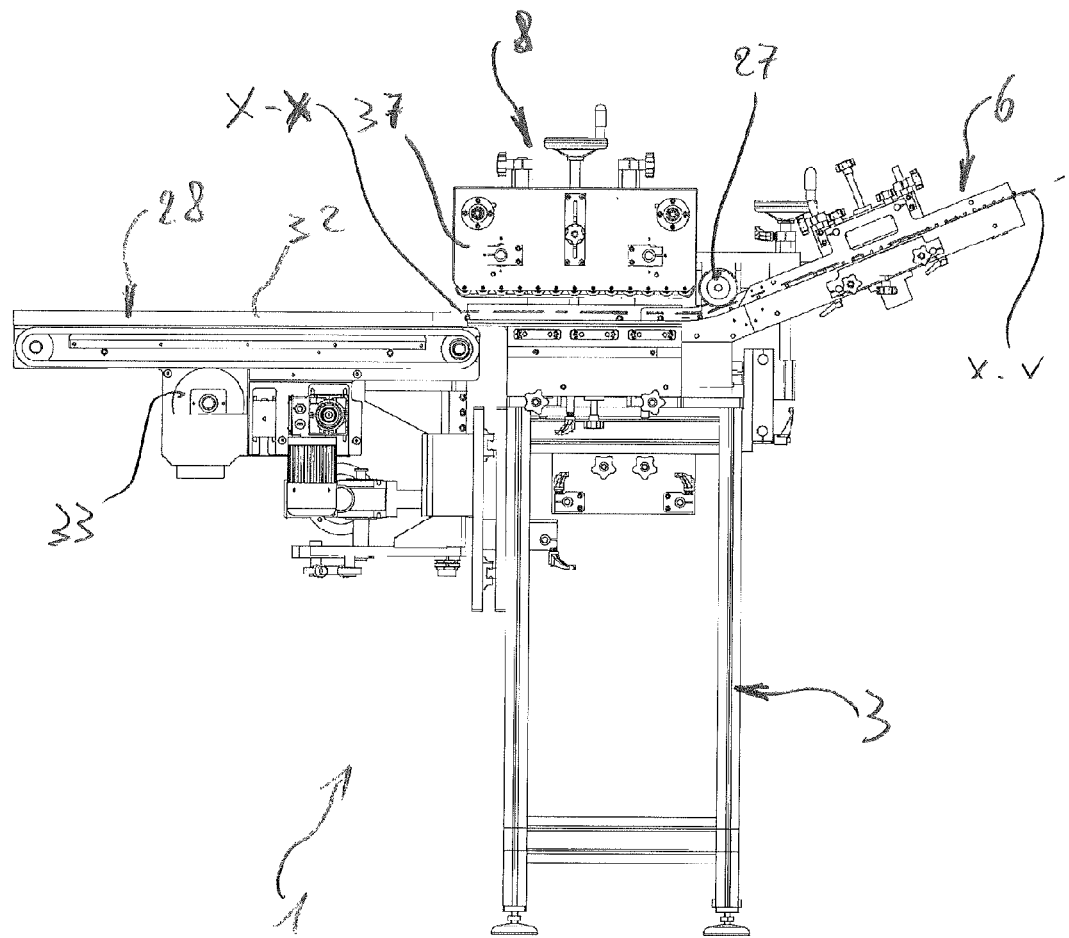
FIG. 5 shows a front plane view of the machine of FIG. 1.
Figure 6:
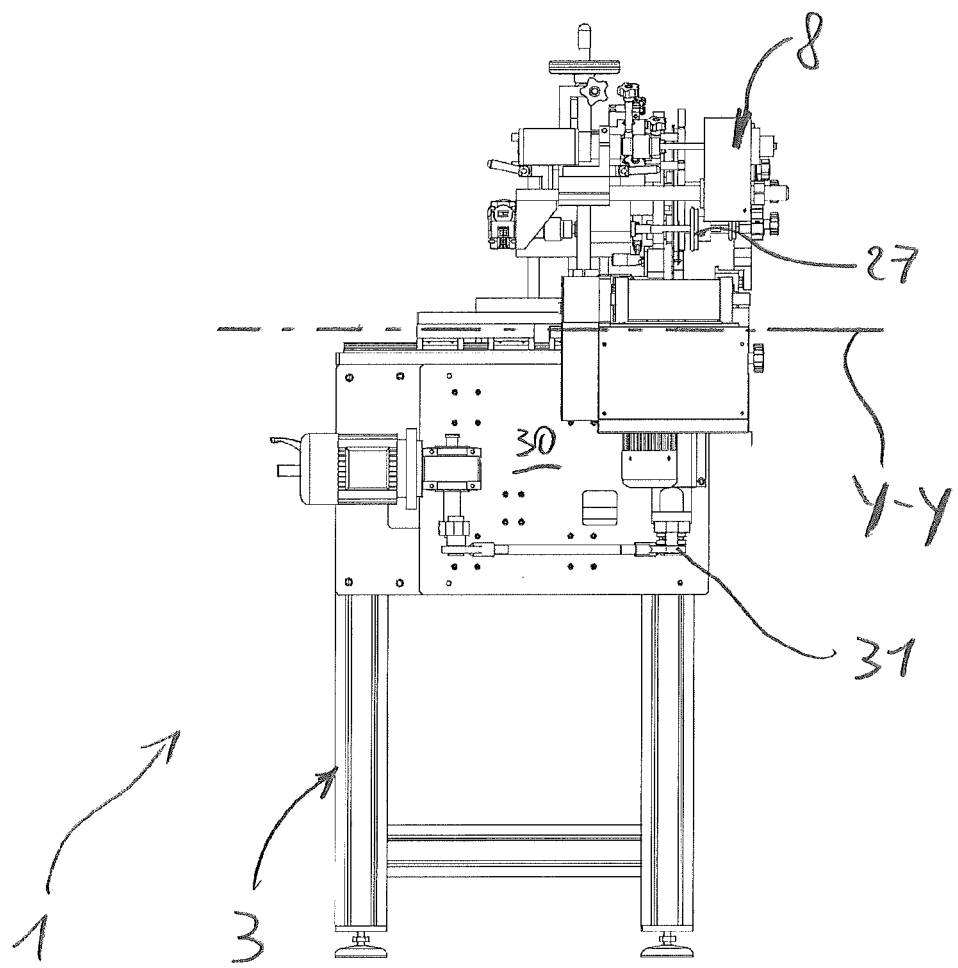
FIG. 6 shows a left side plane view of the machine of FIG. 1.
Figure 7:
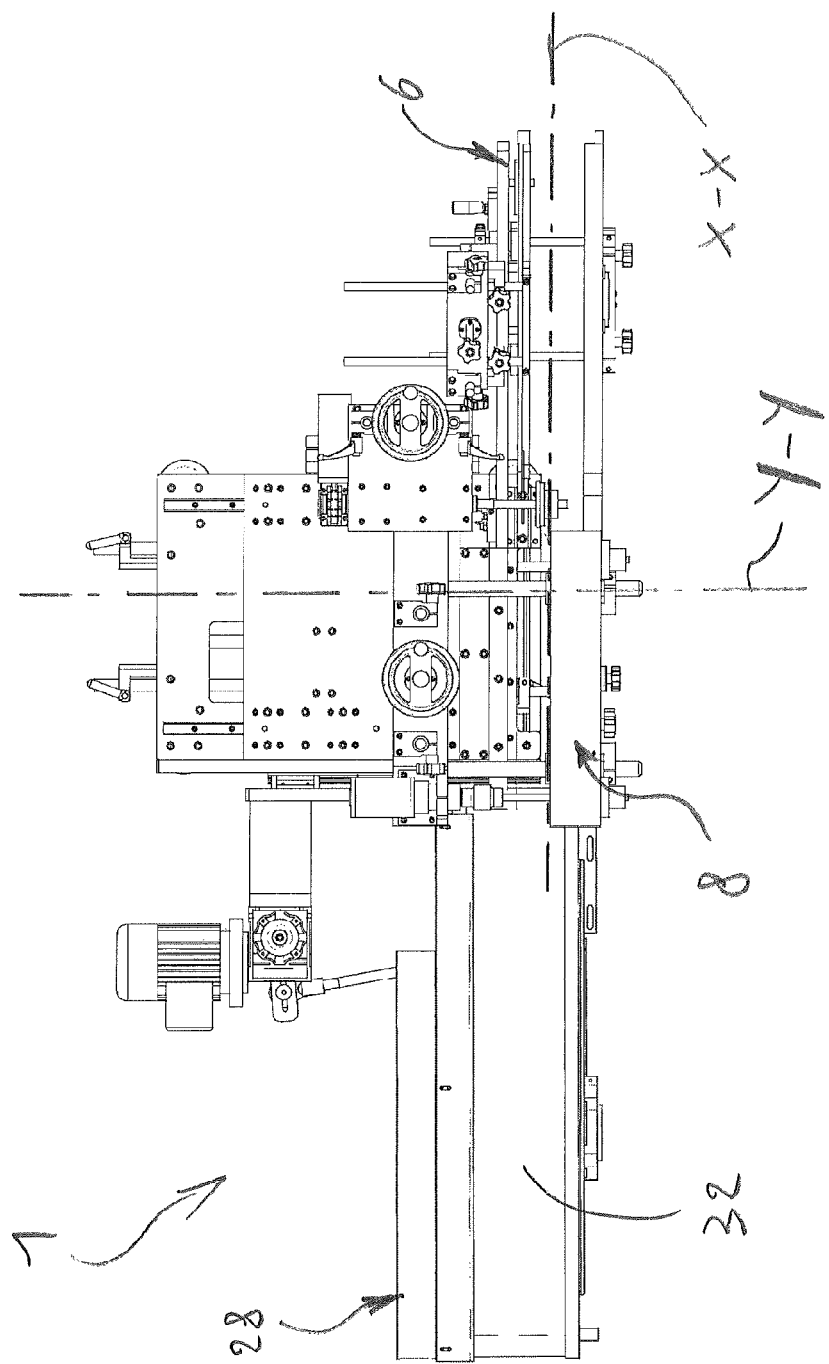
FIG. 7 shows a top plane view of the machine of FIG. 1.
Figure 8A:
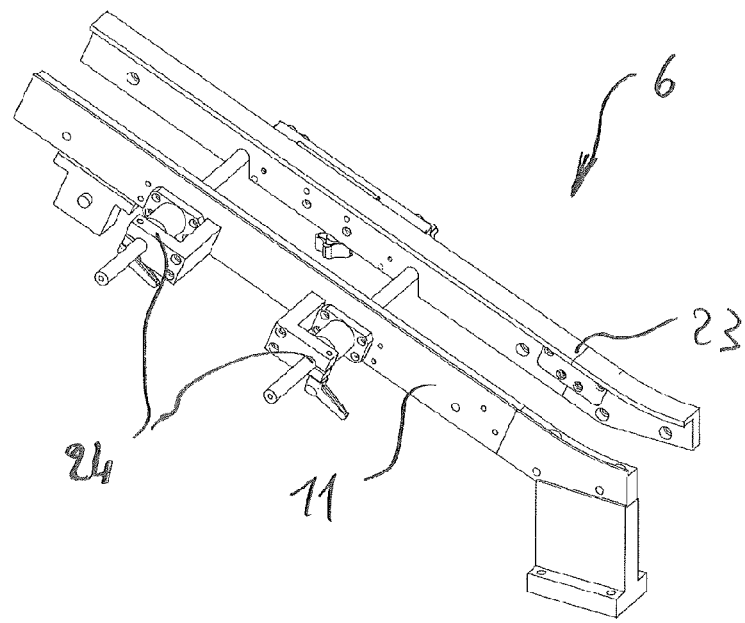
FIG. 8a shows a perspective view of the feed ramp unit of the machine of FIG. 1 as taken from the rear side thereof.
Figure 8B:
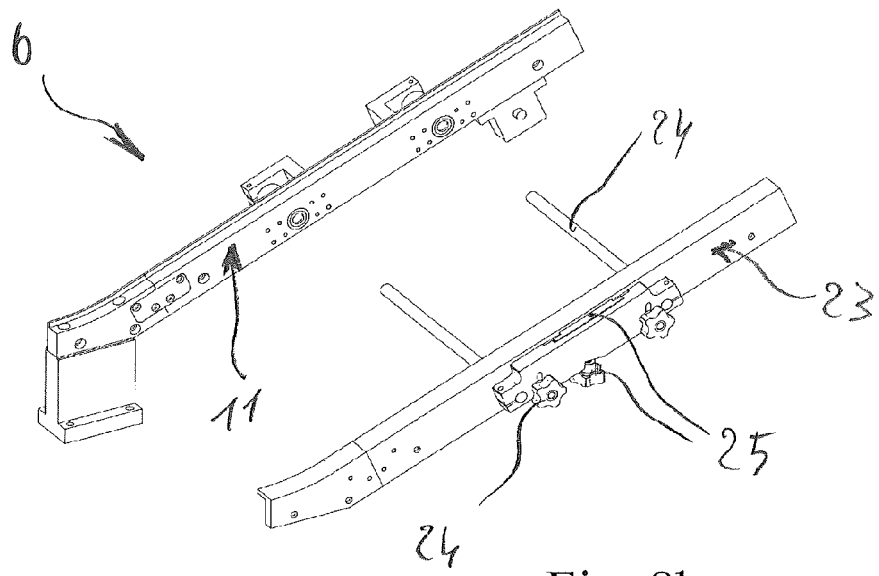
FIG. 8b shows an exploded perspective view of the feed ramp unit of FIG. 8a, as taken from the front side of the machine.
Figure 9A:
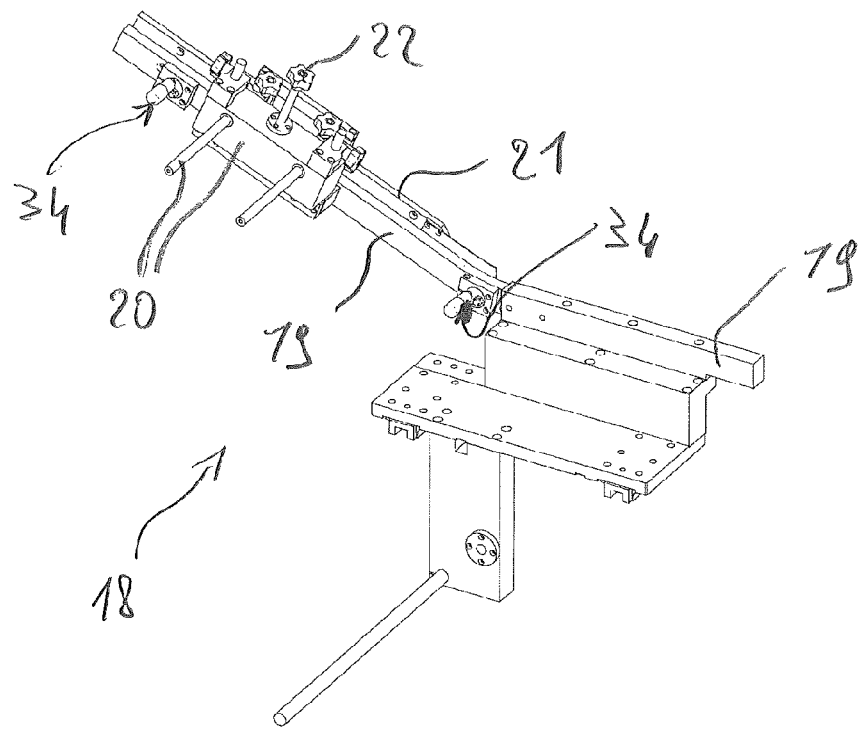
FIG. 9a shows a perspective view of the screw head abutment unit of the machine of FIG. 1 as taken from the rear side thereof.
Figure 9B:
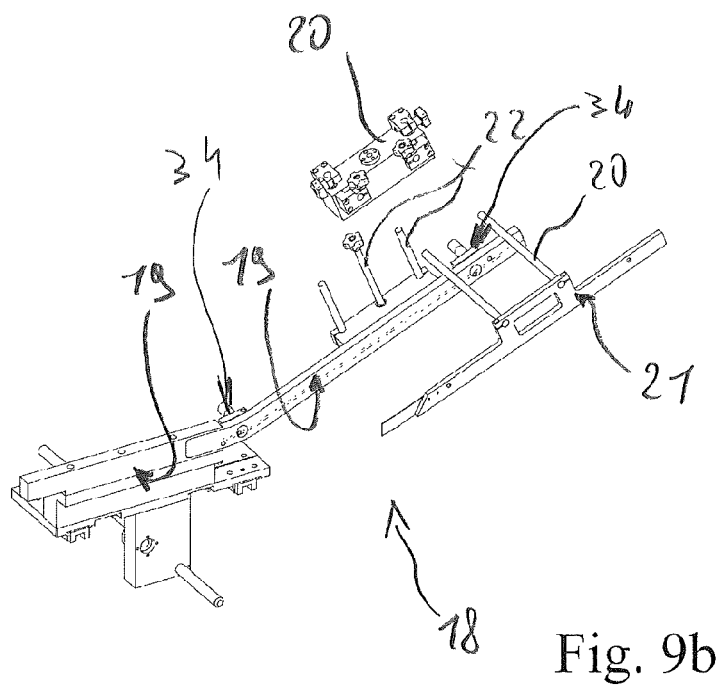
FIG. 9b shows an exploded perspective view of the screw head abutment unit of FIG. 9a as taken from the front side of the machine.
Figures 10A, 10B:
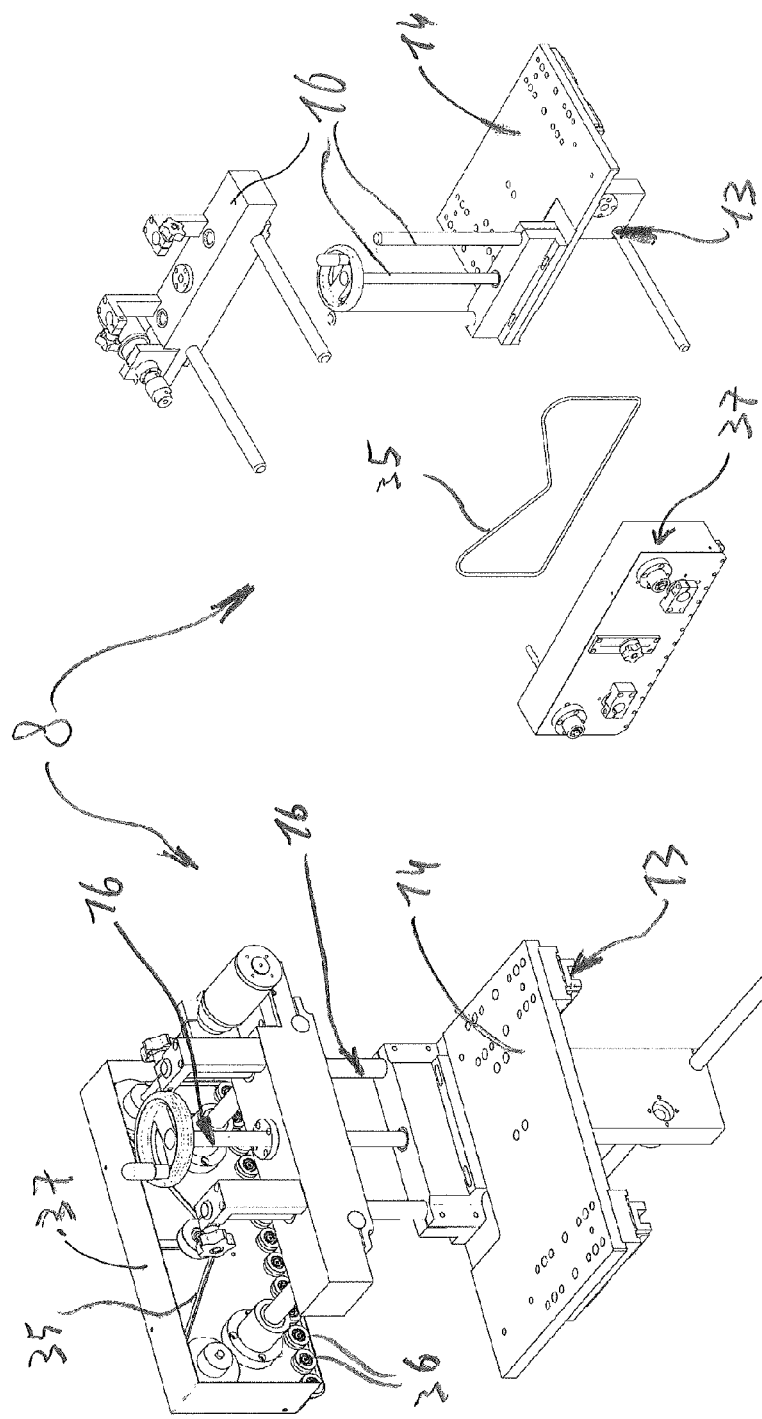
FIG. 10a shows a perspective view of the belt advancing unit of the machine of FIG. 1 as taken from the rear side thereof.
FIG. 10b shows an exploded perspective view of the belt advancing unit of FIG. 10a as taken from the front side of the machine.
Figure 11:
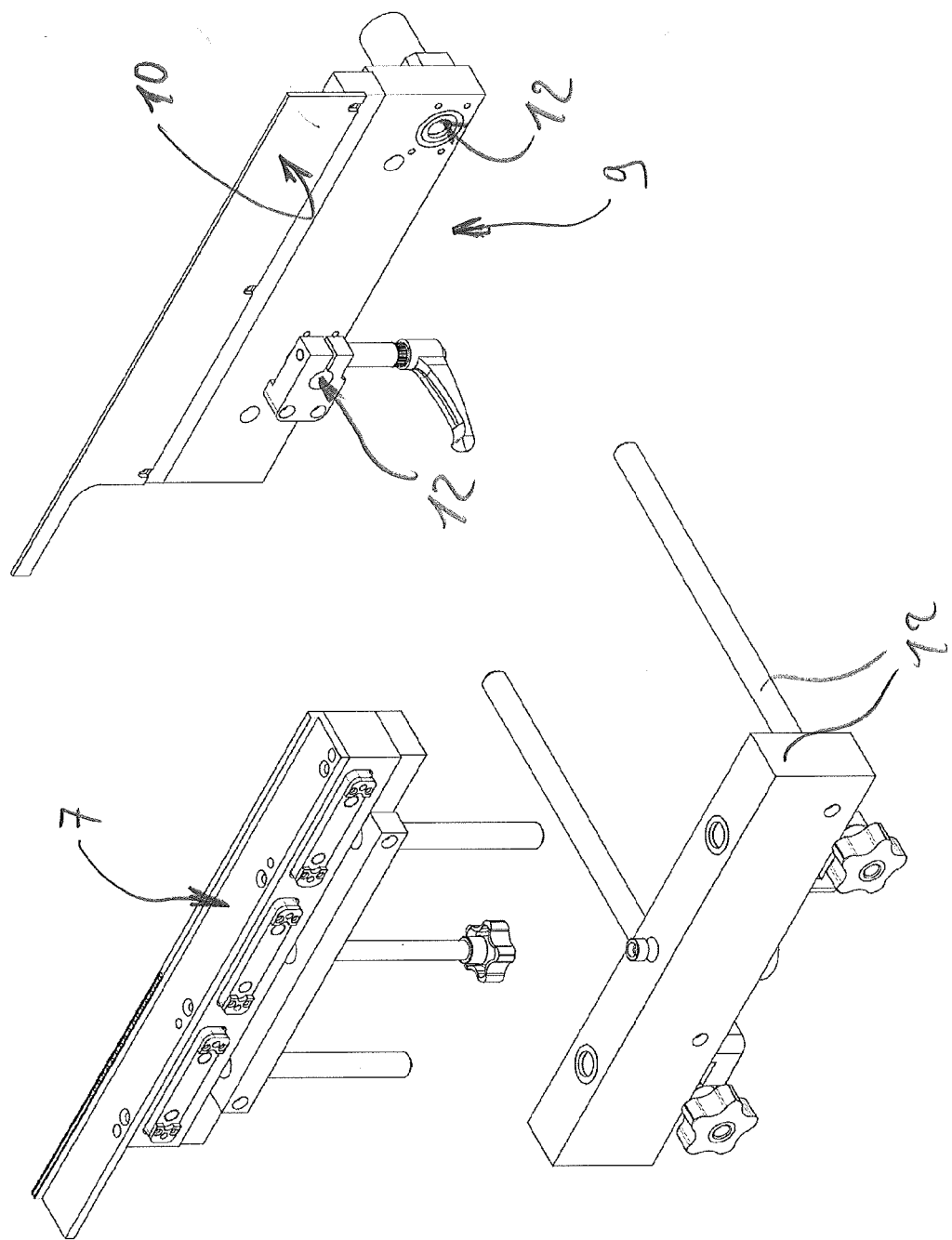
FIG. 11 shows an exploded perspective view of the bearing blade unit and the spreading unit of the machine of FIG. 1 as taken from the front side thereof.
Figure 12:
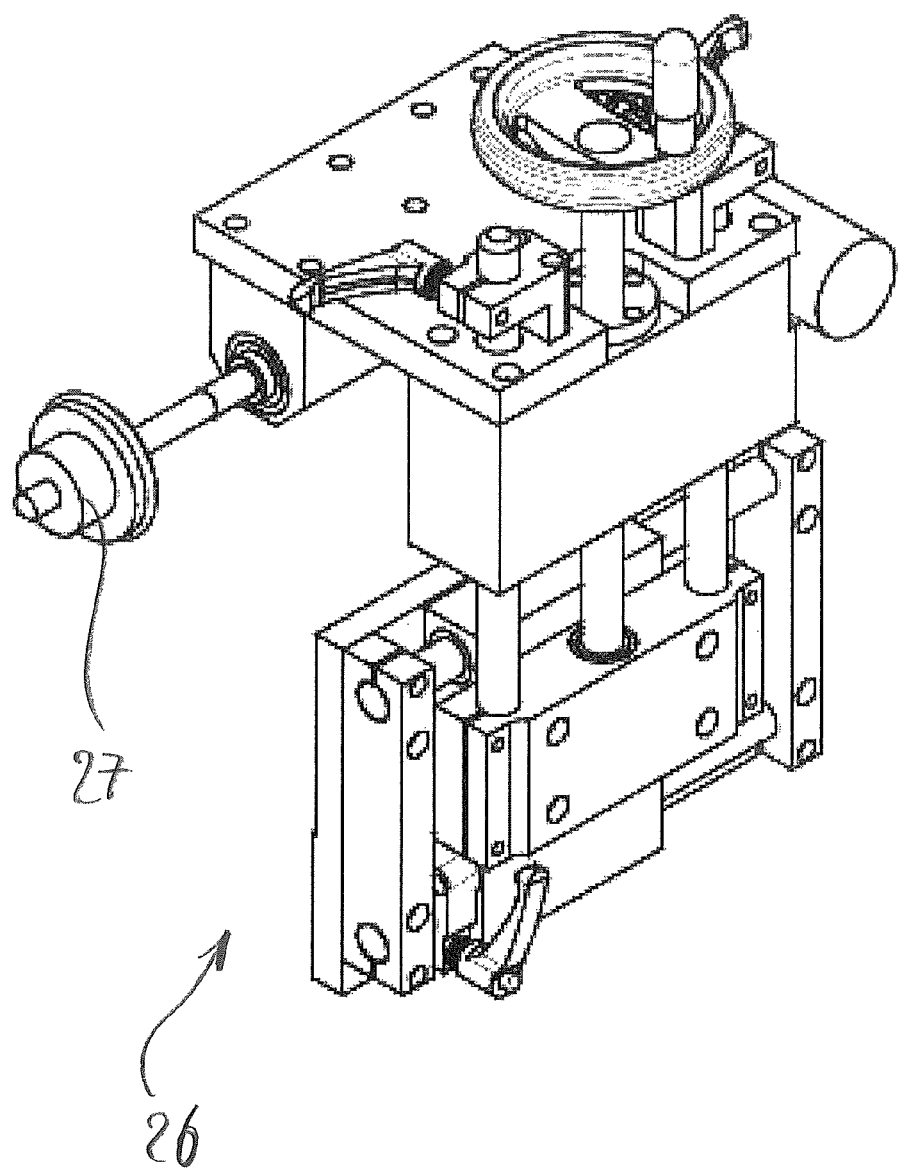
FIG. 12 shows a perspective view of the selective screw advancing unit of the machine of FIG. 1 as taken from the front side thereof.
Figure 13A:
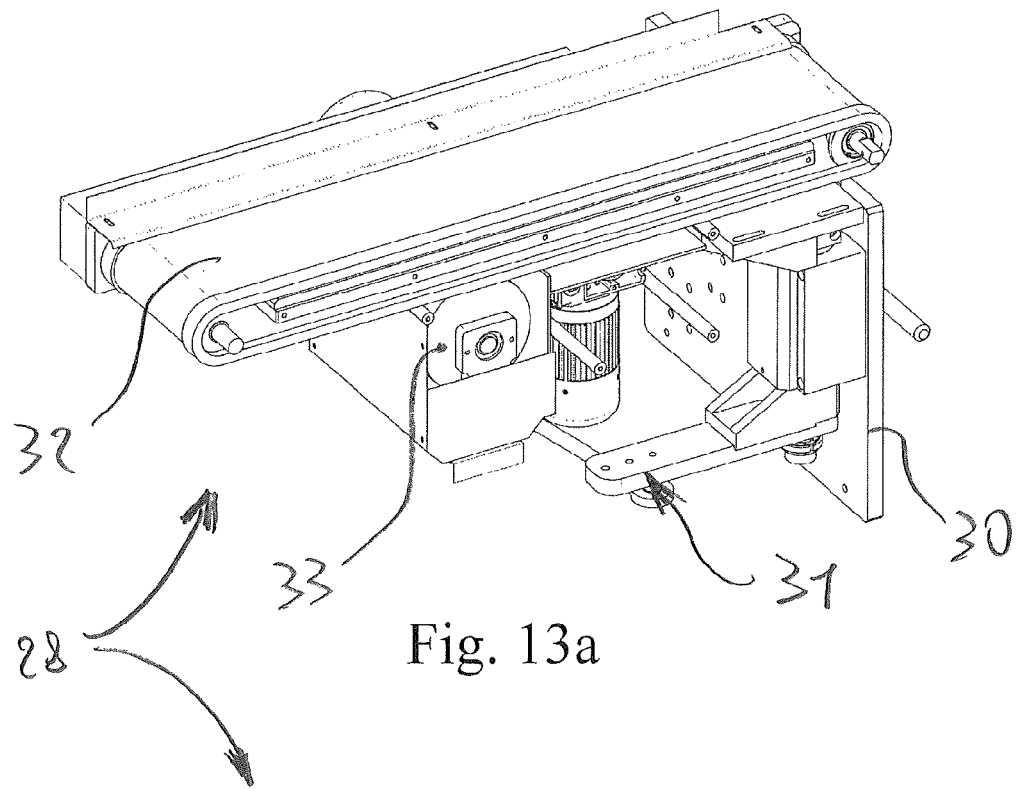
FIG. 13a shows a perspective view of the unloading belt unit of the machine of FIG. 1 as taken from the front side thereof.
Figure 13B:
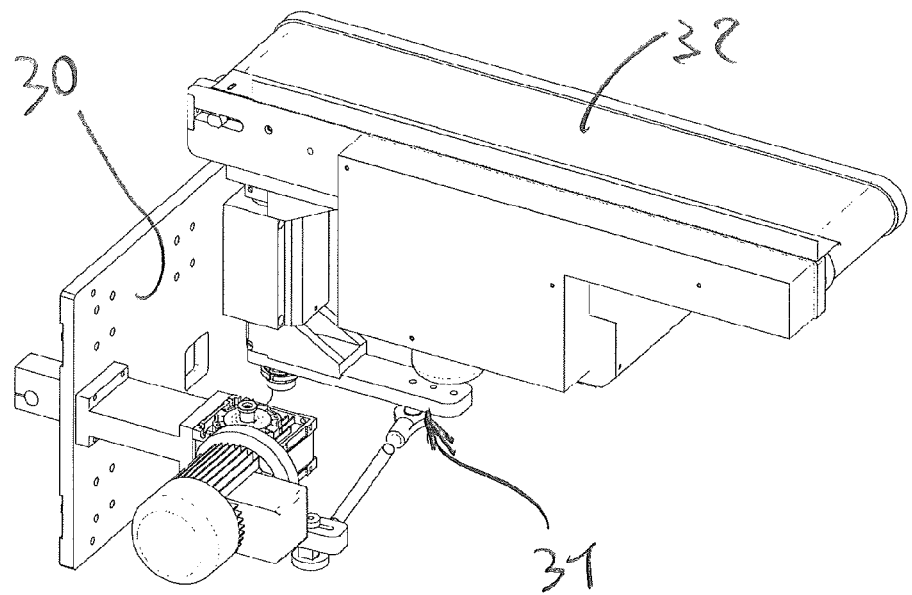
FIG. 13b shows a perspective view of the unloading belt unit of FIG. 13a as taken from the rear side of the machine.
Figure 14:
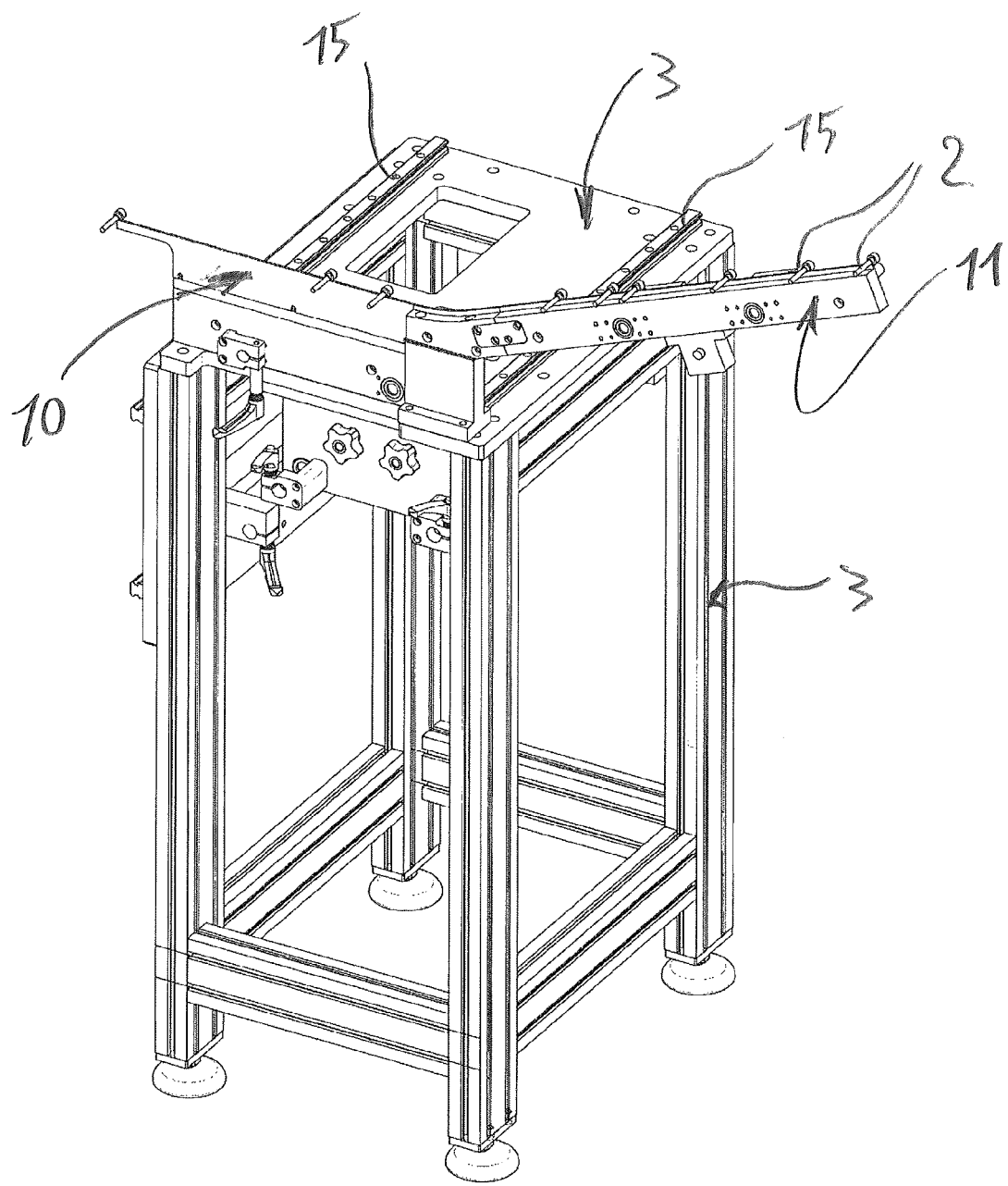
FIG. 14 shows a perspective view as taken from the front side of the machine of FIG. 1, only showing the support frame, the stationary screw heads abutment unit part and the screw bearing blade unit.
Figure 15:
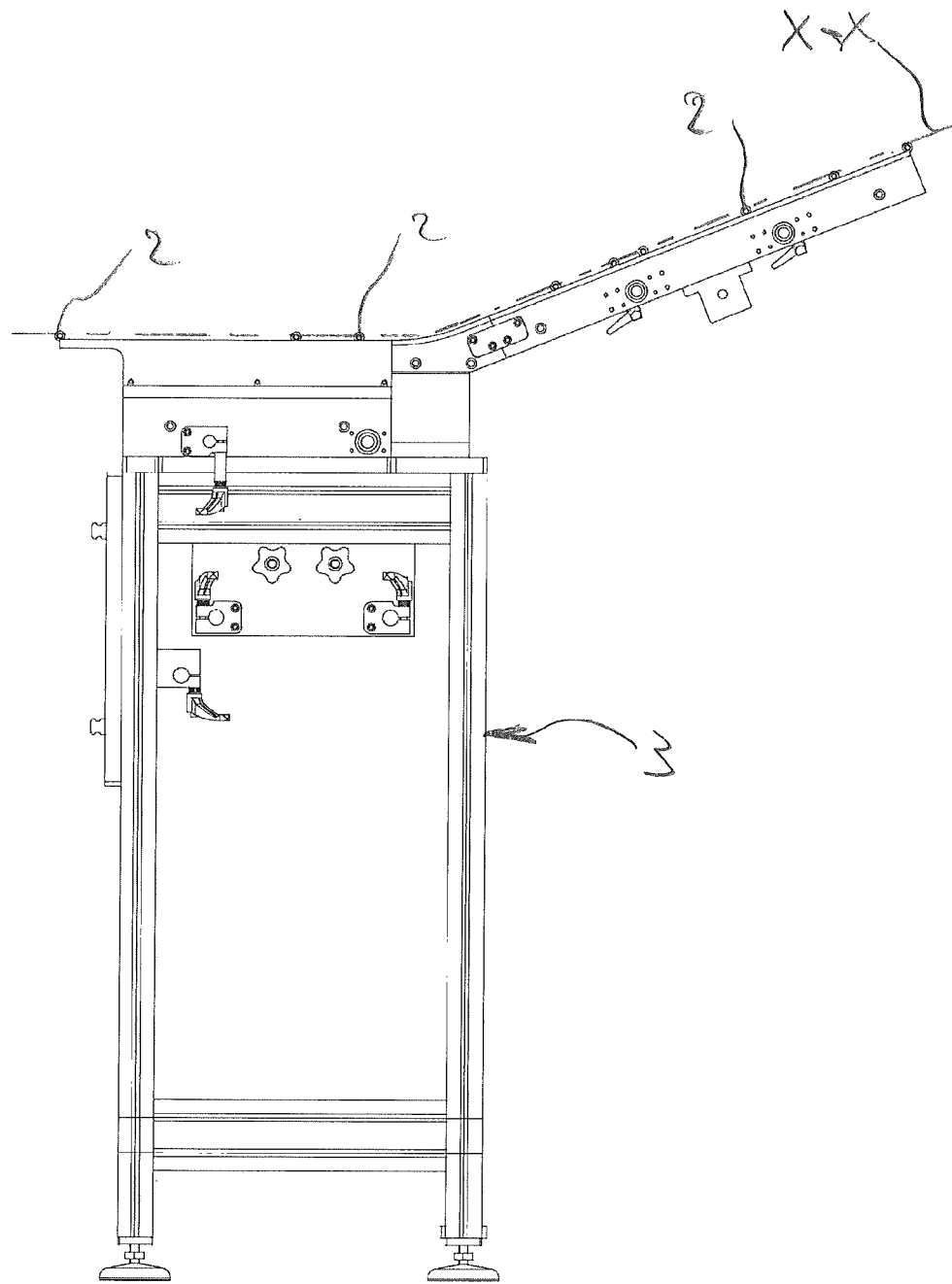
FIG. 15 shows a front plan view of FIG. 14.

Particularly, the machine 1 has a front side as shown in FIG. 5, and a rear side opposite thereto.

Preferably, in the operating space, the screws 2 are supported with such an orientation that their threaded shaft lies on a horizontal plane parallel to the first direction Y-Y that is perpendicular to the path of travel X-X, with the lower free end of the threaded shaft facing the front side of the machine 1.

Advantageously, in the machine of the present disclosure, the abutment means 9 are supported by the support frame 3 and comprise a bearing blade 10 longitudinally extending from the inlet end to the outlet end parallel to the path of travel X-X to support a portion of the shaft of the screws 2 that travel through the operating space along the path of travel.

As shown by the figures (see, for example, FIGS. 14 and 15), the bearing blade 10 extends on a vertical plane, parallel to the front side of the machine 1.

The bearing blade 10 defines an abutment and positioning surface for abutment of the underhead region of the screws 2 that travel through the operating space along the path of travel.

More in detail, the feed ramp unit 6 comprises a stationary portion 11 longitudinally extending along the feed ramp unit 6 and supported by the support frame 3 in joined relationship with the bearing blade 10.

The stationary portion 11 of the feed ramp unit 6 is an extension of the bearing blade 10 and of the path of travel for supporting a portion of the shaft of the screws 2 traveling through the feed ramp unit 6.

The stationary portion 11 of the feed ramp unit 6 defines an abutment and positioning surface for abutment of the underhead region of the screws 2 traveling through the feed ramp unit 6.

It shall be noted that the adjacent facing end portions of the bearing blade 10 and the stationary portion 11 of the feed ramp unit 6 extend coplanar with each other, whereby the bearing blade 10 and the stationary portion 11 of the feed ramp unit 6 define, in the machine 1, a fixed surface relative to the support frame 3, for advantageous abutment and positioning of the screws 2 along such fixed surface in the section upstream from the operating space, and within the operating space.

Advantageously, the dispensing/spreading means 7 are supported by the support frame 3 through first adjustment means 12 which are suitable to allow mutual position adjustment of the dispensing/spreading means 7 relative to the bearing blade 10 along the first direction Y-Y perpendicular to the path of travel X-X.

Concerning the above mentioned advancing means 8, it shall be noted that these means are supported by the support frame 3 through second adjustment means 13, which are suitable to allow mutual position adjustment of the advancing means 8 relative to the bearing blade 10 along the first direction Y-Y perpendicular to the path of travel X-X.

Preferably, these dispensing/spreading means 7 are directly supported by the bearing blade 10, through the first adjustment means 12.

Preferably:
- said second adjustment means 13 include a slide 14 running along two rails 15, which extend in the first direction Y-Y perpendicular to the path of travel X-X, and
- the advancing means 8 are mounted aboard this slide 14 through third adjustment means 16 which are adapted to allow mutual position adjustment of the advancing means 8 relative to the slide 14 in a second direction Z-Z substantially perpendicular both to the path of travel X-X and to the first direction Y-Y perpendicular to the path of travel X-X.

In the illustrated embodiments of the present disclosure, the above mentioned second direction Z-Z is a vertical direction.

The machine 1 is equipped with a head abutment unit 18 comprising an abutment wall 19, which extends parallel to the bearing blade 10 and the stationary portion 11 of the feed ramp unit 6, substantially along their entire longitudinal dimension.

This abutment wall 19 defines an abutment and guide surface for the top head wall of the screws 2 (for example, the wall opposite to the underhead wall).

It shall be noted that, preferably, the head abutment unit 18 is supported by the support frame 3 through fourth adjustment means 20 which are adapted to allow mutual position adjustment of the head abutment unit 18 relative to the bearing blade 10 and to the stationary portion 11 of the feed ramp unit 6 in the first direction Y-Y perpendicular to the path of travel X-X.

Preferably, the head abutment unit 18 comprises a movable bar 21, which:
- extends parallel to the abutment wall 19 substantially along the entire longitudinal dimension of the stationary portion 11 of the feed ramp unit 6, and
- is supported by the abutment wall 19 through fifth adjustment means 22 which are adapted to allow mutual position adjustment of the movable bar 21 relative to the abutment wall 19 in the first direction Y-Y perpendicular to the path of travel X-X, as well as through sixth adjustment means which are adapted to allow mutual position adjustment of the movable bar 21 relative to the abutment wall 19 in the second direction Z-Z substantially perpendicular both to the path of travel X-X and to the first direction Y-Y.

The movable bar 21 is conveniently designed to be placed above the threaded shaft of the screws 2, as the latter travel through the feed ramp unit 6.

It shall be noted that the dispensing/spreading means 7 and the head abutment unit 18 are located on opposite sides of the bearing blade 10, as viewed in the first direction Y-Y perpendicular to the path of travel X-X, as shown in the figures.

Particularly, while the dispensing/spreading means 7 are located between the bearing blade 10 and the front side of the machine 1, the head abutment unit 18 is located between the bearing blade 10 and the rear side of the machine 1.

Preferably, the feed ramp unit 6 comprises a moving portion 23 extending parallel to the stationary portion 11 along the entire longitudinal dimension thereof.

Such moving portion 23 is supported by the stationary portion 11 through seventh adjustment means 24, which are adapted to allow mutual position adjustment of the moving portion 23 relative to the stationary portion 11 in the first direction Y-Y perpendicular to the path of travel X-X, as well as through eighth adjustment means 25, which are adapted to allow mutual position adjustment of the moving portion 23 relative to the stationary portion 11 in the second direction Z-Z.

The stationary portion 11 and the moving portion 23 forming support points, in parallel and spaced relationship with each other in the first direction Y-Y for the screws 2 that travel through the feed ramp unit 6.

The machine 1 comprises a selective feed unit 26 for selectively feeding the screws 2, which is located near the inlet end of the operating space, to cause the screws 2 to be selectively, i.e. individually and separately, advanced to the operating space, by means of the feed ramp unit 6.

Preferably, the selective feed unit 26 comprises a feed gear 27, which is designed to act by its outer peripheral profile upon a portion of the shaft of the screws 2 to drive them into the operating space, where said advancing means 8 are operative.

For this purpose, the feed gear 27 is coated with a high-friction material over its entire periphery.

The machine 1 further comprises a motorized conveyor belt unit 28, located at the outlet end of the operating space to receive the screws 2 that fall out of the operating space by gravity.

Preferably, the motorized conveyor belt unit 28 is mounted aboard a slide 30 that can be moved and aligned along two rails 29 integral with the support frame 3, and extending parallel to the first direction Y-Y perpendicular to the path of travel X-X, to allow position adjustment of the motorized conveyor belt unit 28 in said first direction Y-Y.

The motorized conveyor belt unit 28 is supported by the slide 30 by way of linkage means 31, which are designed to allow the motorized conveyor belt unit 28 to swing in a horizontal plane, such that the treated screws that come out of the operating space do not always fall in the same location of the conveyor belt unit.

The motorized conveyor belt unit 28 comprises a conveyor belt 32 having an upper section designed to receive and support the screws 2 that exit the operating space and a facing lower section, having a contra-rotating brush associated therewith, for interfering with the outer surface of the conveyor belt 32 and ensure continuous cleaning thereof during normal operation.

Advantageously, the machine 1 comprises sensor means 34 for detecting the presence of screws 2 in the feed ramp unit 6.

Preferably:
- an overflow sensor is provided, for assessing the presence of an excessive number of screws 2 in the feed ramp unit 6 and for sending a signal to stop the feed of any further screw 2 from the vibrating feeder that feeds the screws to the machine 1 and/or
- a second sensor is provided, for detecting the presence of screws 2 downstream from said feed gear 27 of the selective feeding unit 26.

Preferably, the sensors are inductive sensors.

Preferably, the sensor means 34 are eccentrically mounted aboard a rotating support whose axis of rotation is parallel to the first direction Y-Y perpendicular to the path of travel X-X such that, by rotating these supports, the vertical position of their respective sensors may be changed to adapt it to the particular size of the screw 2 to be detected.

The above mentioned advancing means 8 are drive belt advancing means, in which a drive belt 35 is rotatably supported by a plurality of rollers 36.

Thus, the drive belt 35 has a friction rolling drive action on the shaft of the screws 2 to cause them to roll forward along the path of travel X-X.

Preferably, the drive belt advancing means 8 are located above the dispensing/spreading means 7, such that the lower section of the drive belt 35 has a friction rolling drive action on a portion of the shaft of said screws 2, which contact the dispensing/spreading means 7 and the drive belt 35, and are interposed therebetween.

This rolling contact between the screws 2 and the dispensing/spreading means 7 ensures proper coating of the threaded shaft of the screw 2 with the glue or other coating material disposed in the dispensing/spreading means 7.

Preferably, the drive belt 35 and the plurality of support rollers 36 are supported in a support box 37, the support box 37 being replaceably associated with the remaining portion of the drive belt advancing means 8, such that it may be easily and quickly replaced as a single unit with a similar support box 37, comprising a corresponding drive belt 35 supported by a corresponding plurality of support rollers 36.

It shall be noted that the structure of the machine 1 and the arrangement of the units as described above and illustrated in the figures allows the above described adjustment means to be accessed from the front side of the machine 1 or the top side, the bottom side or one of its lateral sides, whereas the rear side of the machine 1 has no such adjustment means.

This affords easy adjustment of the machine and its operating units relative to the above mentioned fixed surface defined in the machine with respect to the frame and designed for abutment and positioning of the screws 2 both in the section upstream from the operating space and in the operating space itself.

As clearly shown in the above description, the machine of the present invention fulfills the above mentioned need and also obviates prior art drawbacks as set out in the introduction of this disclosure. Indeed, the machine 1 is designed for use in combination with a vibrating feeder (not shown) of conventional type, that can feed the feed ramp unit with the screws to be coated with a glue or another coating material along at least a predetermined length of their threaded shaft.

For this purpose, the machine 1 and the vibrating feeder shall be simply placed in such position that the fixed surface defined in the machine with respect to the frame and designed for abutment and positioning of the screws 2 both in the section upstream from the operating space and in the operating space itself, is in its proper position with respect to the outlet for the screw in the vibrating feeder. Any later adjustment of the operating units of the machine 1 in the second vertical direction Z-Z and especially in the first direction Y-Y perpendicular to the path of travel X-X is advantageously made without affecting the position of such fixed surface, i.e. without requiring and adjustment/regulation of the position of the feed ramp unit 6 relative to the vibrating feeder.

Those skilled in the art will obviously appreciate that a number of changes and variants may be made to the machine as described hereinbefore to meet specific needs, without departure from the scope of the invention, as defined in the following claims.

The invention claimed is:

1. A machine for applying a coating product to screws, particularly the threaded shaft of a screw, with a coating product, comprising:
    a support frame that defines an operating space through which screws are advanced, said operating space having an inlet end and an outlet end that define a path of travel of said screws through said operating space;
    a feed ramp unit for feeding said screws into said operating space, said feed ramp unit being located at said one inlet end upstream from said operating space, as viewed in a forward direction of travel of said screws, along said preset path of travel, said feed ramp unit having support points defined therein for supporting said screws with the shaft extending in a first direction perpendicular to said path of travel and lying on a horizontal plane;
    dispensing/spreading means supported in said operating space and extending along said preset path of travel between said one inlet end and said one outlet end, for applying a coating product to the shafts of the screws traveling through said operating space;
    advancing means supported in said operating space and operating along said preset path of travel between said one inlet end and said one outlet end, for driving the screws in said operating space;
    abutment means supported in said operating space for defining an abutment and positioning plane for said screws along said path of travel as said screws are advanced from said one inlet end to said one outlet end,
    wherein said abutment means are supported by said support frame and include a bearing blade longitudinally extending from said one inlet end to said one outlet end parallel to the path of travel to support a portion of the shaft of the screws that travel through said operating space along said path of travel,
    wherein said bearing blade defines an abutment and positioning surface for abutment of the underhead region of the screws traveling through said operating space along said path of travel,
    wherein said feed ramp unit comprises a stationary portion longitudinally extending along said feed ramp unit and supported by said support frame in joined relationship with said bearing blade,
    wherein said stationary portion of said feed ramp unit is an extension of said bearing blade and said path of travel for supporting a portion of the shaft of the screws traveling through said feed ramp unit,
    wherein said stationary portion of said feed ramp unit defines an abutment and positioning surface for abutment of the underhead region of the screws traveling through said feed ramp unit,
    wherein the adjacent facing end portions of said bearing blade and said stationary portion of said feed ramp unit extending coplanar with each other, said bearing blade and said stationary portion of said feed ramp unit defining, in said machine, a fixed surface relative to said support frame, for abutment and positioning of the screws in the section upstream from said operating space, and in said operating space, said dispensing/spreading means are supported by said support frame through first adjustment means suitable to allow mutual position adjustment of said dispensing/spreading means relative to said bearing blade in said first direction perpendicular to said path of travel, and
    wherein said advancing means are supported by said support frame through second adjustment means suitable to allow mutual position adjustment of said advancing means relative to said bearing blade in said first direction perpendicular to said path of travel; and
    a head abutment unit comprising an abutment wall extending parallel to said bearing blade and said stationary portion of said feed ramp unit, substantially along their entire longitudinal dimension, to define an abutment and guide surface for the head surfaces of said screws,
    wherein said head abutment unit is supported by said support frame through fourth adjustment means which are adapted to allow mutual position adjustment of said head abutment unit relative to said bearing blade and to said stationary portion of said feed ramp unit in said first direction perpendicular to said path of travel,
    wherein said head abutment unit comprises a movable bar,
    wherein the movable bar extends parallel to said abutment wall substantially along the entire longitudinal dimension of said stationary portion of said feed ramp unit, and
    wherein the moveable bar is supported by said abutment wall through fifth adjustment means which are adapted to allow mutual position adjustment of said movable bar relative to said abutment wall in said first direction perpendicular to said path of travel and through sixth adjustment means which are adapted to allow mutual position adjustment of said movable bar relative to said abutment wall in a second direction substantially perpendicular both to said path of travel and to said first direction perpendicular to said path of travel.

2. The machine according to claim 1, wherein said dispensing/spreading means are supported by said bearing blade through said first adjustment means.

3. The machine according to claim 1,
wherein said second adjustment means include a slide running along two rails which extend in said first direction perpendicular to said path of travel, and
wherein said advancing means are mounted aboard said slide through third adjustment means which are adapted to allow mutual position adjustment of said advancing means relative to said slide in a second direction substantially perpendicular both to said path of travel and to said first direction perpendicular to said path of travel.

4. The machine according to claim 1, wherein said dispensing/spreading means and said head abutment unit are located on opposite sides of said bearing blade, as viewed in said first direction perpendicular to said path of travel.

5. The machine according to claim 1, wherein said advancing means include drive belt advancing means, wherein a drive belt is rotatably supported by a plurality of rollers, said drive belt having a friction rolling drive action on the shaft of said screws to cause them to roll forward along said path of travel.

6. A machine for applying a coating product to screws, particularly the threaded shaft of a screw, with a coating product, comprising:
a support frame that defines an operating space through which screws are advanced, said operating space having an inlet end and an outlet end that define a path of travel of said screws through said operating space;
a feed ramp unit for feeding said screws into said operating space, said feed ramp unit being located at said one inlet end upstream from said operating space, as viewed in a forward direction of travel of said screws, along said preset path of travel, said feed ramp unit having support points defined therein for supporting said screws with the shaft extending in a first direction perpendicular to said path of travel and lying on a horizontal plane;
dispensing/spreading means supported in said operating space and extending along said preset path of travel between said one inlet end and said one outlet end, for applying a coating product to the shafts of the screws traveling through said operating space;
advancing means supported in said operating space and operating along said preset path of travel between said one inlet end and said one outlet end, for driving the screws in said operating space;
abutment means supported in said operating space for defining an abutment and positioning plane for said screws along said path of travel as said screws are advanced from said one inlet end to said one outlet end, wherein said abutment means are supported by said support frame and include a bearing blade longitudinally extending from said one inlet end to said one outlet end parallel to the path of travel to support a portion of the shaft of the screws that travel through said operating space along said path of travel,
wherein said bearing blade defines an abutment and positioning surface for abutment of the underhead region of the screws traveling through said operating space alone said path of travel,
wherein said feed ramp unit comprises a stationary portion longitudinally extending alone said feed ramp unit and supported by said support frame in joined relationship with said bearing blade,
wherein said stationary portion of said feed ramp unit is an extension of said bearing blade and said path of travel for supporting a portion of the shaft of the screws traveling through said feed ramp unit,
wherein said stationary portion of said feed ramp unit defines an abutment and positioning surface for abutment of the underhead region of the screws traveling through said feed ramp unit,
wherein the adjacent facing end portions of said bearing blade and said stationary portion of said feed ramp unit extending coplanar with each other, said bearing blade and said stationary portion of said feed ramp unit defining, in said machine, a fixed surface relative to said support frame, for abutment and positioning of the screws in the section upstream from said operating space, and in said operating space, said dispensing/spreading means are supported by said support frame through first adjustment means suitable to allow mutual position adjustment of said dispensing/spreading means relative to said bearing blade in said first direction perpendicular to said path of travel, and
wherein said advancing means are supported by said support frame through second adjustment means suitable to allow mutual position adjustment of said advancing means relative to said bearing blade in said first direction perpendicular to said path of travel; and
sensor means for detecting a presence of screws in said feed ramp unit, said sensor means being eccentrically mounted aboard a rotating support whose axis of rotation is parallel to said first direction perpendicular to said path of travel.

7. The machine according to claim 5, wherein said drive belt advancing means are located above said dispensing/spreading means, the lower section of said drive belt having a friction rolling drive action on a portion of the shaft of said screws, which contact said dispensing/spreading means and said drive belt, and are interposed therebetween.

8. The machine according to claim 5, wherein said drive belt and said plurality of support rollers are supported in a support box, said support box being replaceable, in said advancing means with another support box comprising a corresponding drive belt supported by a corresponding plurality of support rollers.

9. The machine according to any of claim 1, wherein said adjustment means can be accessed from the front side of the machine or the upper side, the lower side or one of the lateral sides of the machine, and no adjustment means are provided on the rear side of the machine.

10. A machine for applying a coating product to screws, particularly the threaded shaft of a screw, with a coating product, comprising:
a support frame that defines an operating space through which screws are advanced, said operating space having an inlet end and an outlet end that define a path of travel of said screws through said operating space;
a feed ramp unit for feeding said screws into said operating space, said feed ramp unit being located at said one inlet end upstream from said operating space, as viewed in a forward direction of travel of said screws, along said preset path of travel, said feed ramp unit having support points defined therein for supporting said screws with the shaft extending in a first direction lying on a horizontal plane and perpendicular to said path of travel;

dispensing/spreading means supported in said operating space and extending along said preset path of travel between said one inlet end and said one outlet end, for applying a coating product to the shafts of the screws traveling through said operating space;

advancing means supported in said operating space and operating along said preset path of travel between said one inlet end and said one outlet end, for driving the screws in said operating space; and abutment means supported in said operating space for defining an abutment and positioning plane for said screws along said path of travel as said screws are advanced from said one inlet end to said one outlet end,
wherein said abutment means are supported by said support frame and include a bearing blade longitudinally extending from said one inlet end to said one outlet end parallel to the path of travel to support a portion of the shaft of the screws that travel through said operating space along said path of travel, wherein said bearing blade defines an abutment and positioning surface for abutment of the underhead region of the screws traveling through said operating space along said path of travel, wherein said feed ramp unit comprises a stationary portion longitudinally extending along said feed ramp unit and supported by said support frame in joined relationship with said bearing blade, wherein said stationary portion of said feed ramp unit is an extension of said bearing blade and said path of travel for supporting a portion of the shaft of the screws traveling through said feed ramp unit, wherein said stationary portion of said feed ramp unit defines an abutment and positioning surface for abutment of the underhead region of the screws traveling through said feed ramp unit, wherein the adjacent facing end portions of said bearing blade and said stationary portion of said feed ramp unit extending coplanar with each other, said bearing blade and said stationary portion of said feed ramp unit defining, in said machine, a fixed surface relative to said support frame, for abutment and positioning of the screws in the section upstream from said operating space, and in said operating space, wherein said dispensing/spreading means are supported by said support frame through first adjustment means suitable to allow mutual position adjustment of said dispensing/spreading means relative to said bearing blade in said first direction perpendicular to said path of travel, wherein said advancing means are supported by said support frame through second adjustment means suitable to allow mutual position adjustment of said advancing means relative to said bearing blade in said first direction perpendicular to said path of travel, wherein said machine further comprises a head abutment unit comprising an abutment wall extending parallel to said bearing blade and said stationary portion of said feed ramp unit, substantially along their entire longitudinal dimension, to define an abutment and guide surface for the head surfaces of said screws, wherein said head abutment unit is supported by said support frame through fourth adjustment means which are adapted to allow mutual position adjustment of said head abutment unit relative to said bearing blade and to said stationary portion of said feed ramp unit in said first direction perpendicular to said path of travel, wherein said head abutment unit comprises a movable bar, wherein said movable bar extends parallel to said abutment wall substantially along the entire longitudinal dimension of said stationary portion of said feed ramp unit, and wherein said moveable bar is supported by said abutment wall through fifth adjustment means which are adapted to allow mutual position adjustment of said movable bar relative to said abutment wall in said first direction perpendicular to said path of travel and through sixth adjustment means which are adapted to allow mutual position adjustment of said movable bar relative to said abutment wall in a second direction substantially perpendicular both to said path of travel and to said first direction perpendicular to said path of travel.

11. The machine according to claim 10, wherein said adjustment means can be accessed from the front side of the machine or the upper side, the lower side or one of the lateral sides of the machine; and wherein no adjustment means are provided on the rear side of the machine.

12. A machine for applying a coating product to screws, particularly the threaded shaft of a screw, with a coating product, comprising:

a support frame that defines an operating space through which screws are advanced, said operating space having an inlet end and an outlet end that define a path of travel of said screws through said operating space;

a feed ramp unit for feeding said screws into said operating space, said feed ramp unit being located at said one inlet end upstream from said operating space, as viewed in a forward direction of travel of said screws, along said preset path of travel, said feed ramp unit having support points defined therein for supporting said screws with the shaft extending in a first direction lying on a horizontal plane and perpendicular to said path of travel;

dispensing/spreading means supported in said operating space and extending along said preset path of travel between said one inlet end and said one outlet end, for applying a coating product to the shafts of the screws traveling through said operating space;

advancing means supported in said operating space and operating along said preset path of travel between said one inlet end and said one outlet end, for driving the screws in said operating space; and abutment means supported in said operating space for defining an abutment and positioning plane for said screws along said path of travel as said screws are advanced from said one inlet end to said one outlet end,
wherein said abutment means are supported by said support frame and include a bearing blade longitudinally extending from said one inlet end to said one outlet end parallel to the path of travel to support a portion of the shaft of the screws that travel through said operating space along said path of travel, wherein said bearing blade defines an abutment and positioning surface for abutment of the underhead region of the screws traveling through said operating space along said path of travel, wherein said feed ramp unit comprises a stationary portion longitudinally extending along said feed ramp unit and supported by said support frame in joined relationship with said bearing blade, wherein said stationary portion of said feed ramp unit is an extension of said bearing blade and said path of travel for supporting a portion of the shaft of the screws traveling through said feed ramp unit, wherein said stationary portion of said feed ramp unit defines an abutment and positioning surface for abutment of the underhead region of the screws traveling through said feed ramp unit, wherein the adjacent facing end portions of said bearing blade and said stationary portion of said feed ramp unit extending coplanar with each other, said bearing blade and said stationary portion of said feed ramp unit defining, in said machine, a fixed surface relative to said support frame, for abutment and positioning of the screws in the section upstream from said operating space, and in said operating space, wherein said dispensing/spreading means are supported by said support frame through first adjustment means suitable to allow mutual position adjustment of said dispensing/spreading means relative to said bearing blade in said first direction perpendicular to said path of travel, wherein said advancing means are supported by said support frame through second adjustment means suitable to allow mutual position adjustment of said advancing means relative to said bearing blade in said first direction perpendicular to said path of travel, wherein said feed ramp unit further comprises a moving portion extending parallel to said stationary portion along the entire longitudinal dimension thereof, wherein said moving portion is supported by said stationary portion through seventh adjustment means which are adapted to allow mutual position adjustment of said moving portion relative to said stationary portion in said first direction perpendicular to said path of travel and through eighth adjustment means which are adapted to allow mutual position adjustment of said moving portion relative to said stationary portion in a second direction substantially perpendicular both to said path of travel and to said first direction perpendicular to said path of travel, and wherein said stationary portion and said moving portion forming support points, in parallel and spaced relationship with each other in said first direction perpendicular to said path of travel, for the screws that travel through said feed ramp unit.

13. The machine according to claim 12, wherein said machine further comprises a selective feed unit for selectively feeding the screws, which is located near said one inlet end of said operating space, to cause the screws to be selectively advanced to said operating space, by means of said feed ramp unit.

14. The machine according to claim 13, wherein said selective feed unit comprises a feed gear configured, by its outer periphery upon a portion of a shank of the screws, to drive them into said operating space, where said advancing means are operative.

15. The machine according to claim 12, wherein said adjustment means can be accessed from the front side of the machine or the upper side, the lower side or one of the lateral sides of the machine; and wherein no adjustment means are provided on the rear side of the machine.

16. A machine for applying a coating product to screws, particularly the threaded shaft of a screw, with a coating product, comprising:

a support frame that defines an operating space through which screws are advanced, said operating space having an inlet end and an outlet end that define a path of travel of said screws through said operating space;

a feed ramp unit for feeding said screws into said operating space, said feed ramp unit being located at said one inlet end upstream from said operating space, as viewed in a forward direction of travel of said screws, along said preset path of travel, said feed ramp unit having support points defined therein for supporting said screws with the shaft extending in a first direction lying on a horizontal plane and perpendicular to said path of travel;

dispensing/spreading means supported in said operating space and extending along said preset path of travel between said one inlet end and said one outlet end, for applying a coating product to the shafts of the screws traveling through said operating space;

advancing means supported in said operating space and operating along said preset path of travel between said one inlet end and said one outlet end, for driving the screws in said operating space; and abutment means supported in said operating space for defining an abutment and positioning plane for said screws along said path of travel as said screws are advanced from said one inlet end to said one outlet end, wherein said abutment means are supported by said support frame and include a bearing blade longitudinally extending from said one inlet end to said one outlet end parallel to the path of travel to support a portion of the shaft of the screws that travel through said operating space along said path of travel, wherein said bearing blade defines an abutment and positioning surface for abutment of the underhead region of the screws traveling through said operating space along said path of travel, wherein said feed ramp unit comprises a stationary portion longitudinally extending along said feed ramp unit and supported by said support frame in joined relationship with said bearing blade, wherein said stationary portion of said feed ramp unit is an extension of said bearing blade and said path of travel for supporting a portion of the shaft of the screws traveling through said feed ramp unit, wherein said stationary portion of said feed ramp unit defines an abutment and positioning surface for abutment of the underhead region of the screws traveling through said feed ramp unit, wherein the adjacent facing end portions of said bearing blade and said stationary portion of said feed ramp unit extending coplanar with each other, said bearing blade and said stationary portion of said feed ramp unit defining, in said machine, a fixed surface relative to said support frame, for abutment and positioning of the screws in the section upstream from said operating space, and in said operating space, wherein said dispensing/spreading means are supported by said support frame through first adjustment means suitable to allow mutual position adjustment of said dispensing/spreading means relative to said bearing blade in said first direction perpendicular to said path of travel, wherein said advancing means are supported by said support frame through second adjustment means suitable to allow mutual position adjustment of said advancing means relative to said bearing blade in said first direction perpendicular to said path of travel, wherein said machine further comprises a motorized conveyor belt unit located at said one outlet end of said operating space to receive the screws that exit said operating space, wherein said motorized conveyor belt unit is mounted aboard a slide that can be moved and aligned along two rails integral with said support frame, the support frame extending in said first direction perpendicular to said path of travel to allow position adjustment of said motorized conveyor belt unit in said first direction, and wherein said motorized conveyor belt is supported by said slide by way of linkage means, the linkage means being configured to allow said motorized conveyor belt unit to swing in a horizontal plane.

17. The machine according to claim 16, wherein said motorized conveyor belt unit comprises
   a conveyor belt having an upper section designed to receive and support the screws that exit said operating space, and
   a facing lower section, a contra-rotating brush being associated with said lower section of the conveyor belt, for interfering with the outer surface of the conveyor belt and ensuring continuous cleaning thereof.

18. The machine according to claim 16, wherein said adjustment means can be accessed from the front side of the machine or the upper side, the lower side or one of the lateral sides of the machine; and wherein no adjustment means are provided on the rear side of the machine.

* * * * *